No. 669,607. Patented Mar. 12, 1901.
A. J. & P. J. WICKMAN.
GRAIN WEIGHER AND BAGGER.
(Application filed June 11, 1900.)
(No Model.) 2 Sheets—Sheet 2.
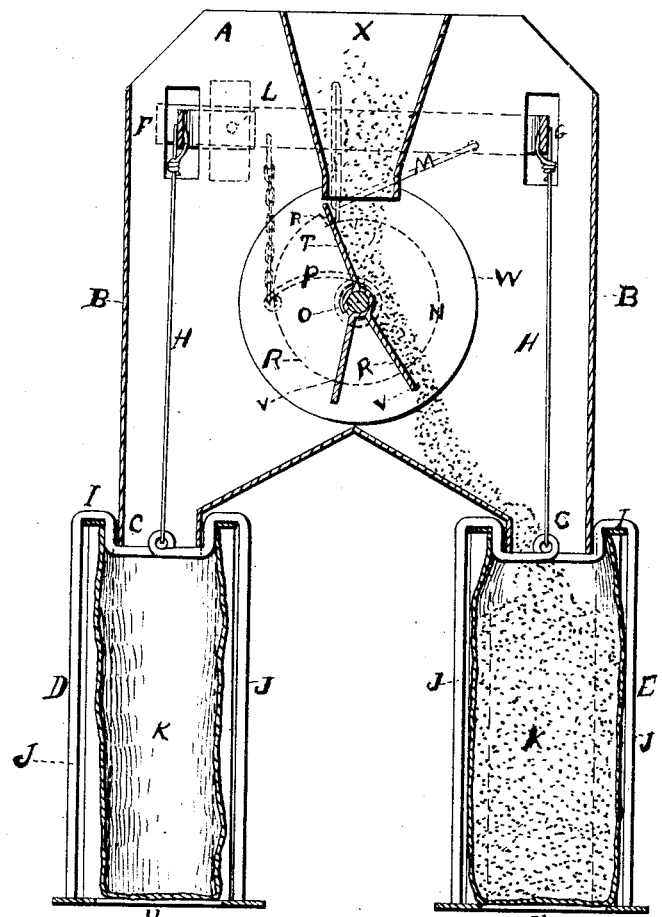
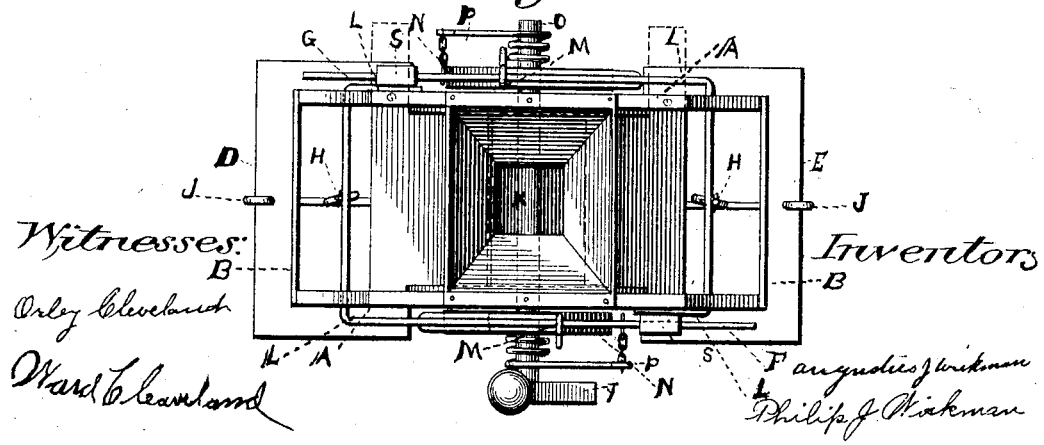

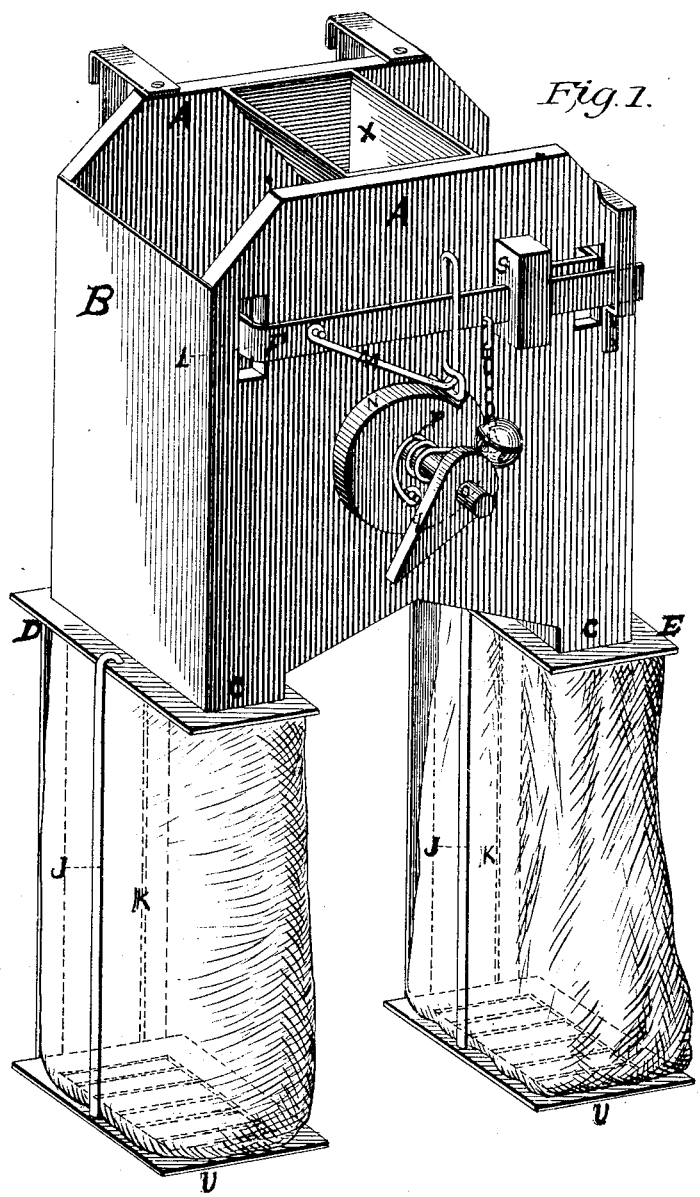

UNITED STATES PATENT OFFICE.

AUGUSTUS J. WICKMAN AND PHILIP J. WICKMAN, OF NEVADA MILLS, INDIANA.

GRAIN WEIGHER AND BAGGER.

SPECIFICATION forming part of Letters Patent No. 669,607, dated March 12, 1901.

Application filed June 11, 1900. Serial No. 19,984. (No model.)

*To all whom it may concern:*

Be it known that we, AUGUSTUS J. WICKMAN and PHILIP J. WICKMAN, citizens of the United States, residing at Nevada Mills, county of Steuben, and State of Indiana, have invented a new and useful Grain Weigher and Bagger, of which the following is a specification.

Our invention relates to improvements in grain weighers and baggers attached to threshing or other machines; and the objects of our improvement are, first, to provide a way for the weighing of the grain in the bag, which it enters in a continuous stream from the thresher or other machine; second, to provide an automatic trip or cut-off which changes the flow of grain from one bag to the other when the required amount of grain is in the bag, and, third, to provide an alarm which when the trip or cut-off is operated will give notice that the sack contains the required number of pounds of grain and should be removed and replaced by another. We attain these objects by the mechanism illustrated in the accompanying drawings, in which—

Figure 1 is a view of front side of entire machine, the back side appearing the same with the exception of the bell and pointer and with the addition of the rods and hooks with which it is attached to the threshing-machine. Fig. 2 is a vertical section of the entire machine, showing arrangement of the inside for directing the grain into the bags. Fig. 3 is a top view of machine.

Similar letters refer to similar parts throughout the several views.

The side pieces A A and the end pieces B B and the spouts C C form the framework of the machine. Playing loosely on the spouts C C are the bag-holders D and E, which are hung on the scale-beams F G by means of the rods H H, having links or hooks on upper ends, by which they are hung on scale-beams F G, and hooks on lower ends, on which hang the bag-holders, as shown in Fig. 2.

The bag-holders D E are made with perforated bottoms U U$^a$ and framework I I, surrounding spouts C C, and rods J J J J, as shown in Fig. 1, with the addition of back pieces and braces to give the bag-holders sufficient strength and solidness. The bags K K are fastened inside of bag-holders, as shown in Fig. 1, forming a receptacle for the grain.

The scale-beams F G are hung on bearings L L L L, attached to side pieces A A, square holes being cut in pieces A A to admit scale-beams into their proper places.

Attached to the scale-beams F G are the weights S S, which are adjustable to the required number of pounds, and the dogs M M, made and attached to scale-beams F G in such a way as to slide on the upper rims of the wheels N N and catch in the notches on the rims of said wheels, as shown in Fig. 1. The wheels N N are both attached to shaft O, carrying bell and pointer Q$^2$, springs P P$^2$, and trip or cut-off R R R.

The dog M is released by scale-beam F, (which is operated by the weight of the grain in the bag,) and the trip or cut-off R R R$^2$ is thrown over by spring P$^2$ and caught on opposite side by dog M, which in turn is released by scale-beam G and caught again by first dog M.

The trip or cut-off R R R$^2$ consists of an upright piece of sheet-iron T or other material, having two flanges V V attached to lower edge. The grain striking one of these flanges V V tends to balance the trip, making it operate easily. The trip or cut-off R R R$^2$ also has two side pieces, (shown by circle W,) forming a channel for the grain to run in whichever way the trip or cut-off R R R' is turned.

The hopper X is placed directly over the trip or cut-off R R R' and serves to guide the grain into the trip or cut-off R R' R, as shown in the drawings. The open places on each side of hopper X are intended to be closed up, if desired.

The bagger and weigher is attached to side of threshing or other machine by means of rods bolted onto bagger at one end and forming hooks at the other ends to hook in brackets or loops bolted on threshing or other machine.

What we claim as our invention, and desire to secure by Letters Patent, is—

In an automatic weighing-machine the combination of a bifurcated chute, a scale-beam pivotally mounted upon each side of said chute, a receptacle suspended from each scale-beam below said chute, a transverse shaft pivoted in said chute, a deflector rigidly attached thereto, a notched disk fixed to said shaft under each scale-beam, and springs on said shaft attached to said disks and said scale-beams, latches pivotally attached to said scale-beams, and adapted to engage in said notches in said disks, a pointer attached to said shaft external to said chute and a bell attached to said pointer, the rods and hooks attached to the back side of said chute, and adapted to engage in brackets attached to side of threshing or other machine, all substantially as described and set forth.

AUGUSTUS J. WICKMAN.
PHILIP J. WICKMAN.

Witnesses:
ORLEY CLEVELAND,
WARD CLEAVELAND.